(12) United States Patent
Kim (10) Patent No.: US 12,325,484 B2
(45) Date of Patent: Jun. 10, 2025

(54) PERSONAL MOBILITY DEVICE, SYSTEM FOR STEERING PERSONAL MOBILITY DEVICE, AND METHOD OF CONTROLLING PERSONAL MOBILITY DEVICE

(71) Applicants: Hyundai Motor Company, Seoul (KR); Kia Corporation, Seoul (KR)

(72) Inventor: Do-Kon Kim, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 306 days.

(21) Appl. No.: 17/972,280

(22) Filed: Oct. 24, 2022

(65) Prior Publication Data

US 2023/0406439 A1 Dec. 21, 2023

(30) Foreign Application Priority Data

Jun. 20, 2022 (KR) .......................... 10-2022-0074962

(51) Int. Cl.
*B62K 5/08* (2006.01)
*B62J 43/10* (2020.01)
(Continued)

(52) U.S. Cl.
CPC .................. *B62K 5/08* (2013.01); *B62J 43/10* (2020.02); *B62K 5/007* (2013.01); *B62K 21/00* (2013.01)

(58) Field of Classification Search
CPC .......... B62K 5/08; B62K 5/007; B62K 21/00; B62K 3/002; B62J 43/10; B62J 45/41;
(Continued)

(56) References Cited

U.S. PATENT DOCUMENTS

| 6,443,020 B1 * | 9/2002 | Lin .......................... B62D 6/10 |
| | | 73/862.334 |
| 8,567,262 B2 * | 10/2013 | Tsuda ....................... B62K 5/08 |
| | | 73/862.335 |

(Continued)

FOREIGN PATENT DOCUMENTS

| CN | 109562011 A | * | 4/2019 | ................ B62J 1/12 |
| CN | 110789646 A | * | 2/2020 | ................ B62J 1/08 |

(Continued)

OTHER PUBLICATIONS

Translated CN-110789646-A (Year: 2024).*

*Primary Examiner* — James A Shriver, II
*Assistant Examiner* — Ian Bryce Shelton
(74) *Attorney, Agent, or Firm* — Banner & Witcoff, Ltd.

(57) ABSTRACT

The present disclosure provides a personal mobility device including a personal mobility device body including a first wheel mounted at a front portion and a second wheel mounted at a rear portion with respect to a longitudinal direction of the personal mobility device body. The personal mobility device may include a steering rod that includes an operable handle, and mountable on any one of steering apparatus connectors at the front portion or the rear portion. A load cell assembly may be provided on each of the steering apparatus connectors, and each including a plurality of load cells. The personal mobility device may enable steering control using a low-cost load cell, and facilitate steering in either direction of the personal mobility device.

18 Claims, 5 Drawing Sheets

(51) Int. Cl.
*B62K 5/007* (2013.01)
*B62K 21/00* (2006.01)

(58) Field of Classification Search
CPC ........ B62D 5/001; B62D 1/02; B62D 5/0403; B62D 6/10; B62D 15/0215; B60K 7/0007; B60Y 2200/91; B60Y 2400/3086
See application file for complete search history.

(56) References Cited

U.S. PATENT DOCUMENTS

| | | | | |
|---|---|---|---|---|
| 8,783,118 B2* | 7/2014 | Kato | ........................ | B62K 21/00 73/862.335 |
| 9,174,623 B2* | 11/2015 | Yamada | ................ | B60T 17/221 |
| 9,366,523 B2* | 6/2016 | Klimenko | ............... | F24S 20/69 |
| 10,023,260 B2* | 7/2018 | Mori | ........................ | B62K 21/02 |
| 10,450,028 B2* | 10/2019 | Kama | ..................... | B62K 11/14 |
| 10,556,617 B2* | 2/2020 | Wang | ..................... | B62D 5/0424 |
| 2004/0216929 A1* | 11/2004 | White | ..................... | B60L 8/003 180/2.2 |
| 2006/0220334 A1* | 10/2006 | Liao | ......................... | B62B 1/002 280/655.1 |
| 2011/0239786 A1* | 10/2011 | Tsuda | ........................ | B62K 5/08 73/862.335 |
| 2011/0239787 A1* | 10/2011 | Kato | ........................ | B62K 21/00 73/862.335 |
| 2012/0004808 A1* | 1/2012 | Kuramori | ............... | G01L 5/221 701/41 |
| 2014/0320120 A1* | 10/2014 | Klimenko | ................ | G01B 7/30 324/207.25 |
| 2017/0088229 A1* | 3/2017 | Mori | ...................... | B62K 25/08 |
| 2018/0065701 A1* | 3/2018 | Kama | ..................... | B62K 5/027 |
| 2018/0297629 A1* | 10/2018 | Wang | ...................... | B62D 5/046 |
| 2023/0064025 A1* | 3/2023 | Lee | ......................... | B62D 5/001 |
| 2023/0264738 A1* | 8/2023 | Watanabe | ............ | B62D 5/0469 180/402 |
| 2024/0278870 A1* | 8/2024 | Guillaume | ................ | B62L 3/08 |

FOREIGN PATENT DOCUMENTS

| | | | | | |
|---|---|---|---|---|---|
| CN | 110789646 B | * | 3/2021 | ............... | B62J 1/08 |
| CN | 214138807 U | * | 9/2021 | ............ | B60K 7/0007 |
| CN | 214138823 U | * | 9/2021 | ............. | B62K 3/002 |
| GB | 2586070 A | * | 2/2021 | ........... | A63C 17/012 |
| JP | 2007118800 A | * | 5/2007 | | |
| JP | 2007-145040 A | | 6/2007 | | |
| KR | 20-2012-0001845 A | | 3/2012 | | |
| KR | 10-2017-0016083 A | | 2/2017 | | |
| KR | 20170016083 A | * | 2/2017 | | |
| KR | 20170070322 A | * | 6/2017 | | |
| KR | 20200094411 A | * | 8/2020 | | |
| WO | WO-2019158912 A1 | * | 8/2019 | ............... | B62D 9/02 |
| WO | WO-2020211891 A1 | * | 10/2020 | | |

\* cited by examiner

PERSONAL MOBILITY DEVICE, SYSTEM FOR STEERING PERSONAL MOBILITY DEVICE, AND METHOD OF CONTROLLING PERSONAL MOBILITY DEVICE

CROSS-REFERENCE TO RELATED APPLICATION

This application claims priority to Korean Patent Application No. 10-2022-0074962, filed on Jun. 20, 2022, which is incorporated herein by reference in its entirety.

BACKGROUND

Field

The present disclosure relates to a personal mobility device, a system for steering the personal mobility device, and a method of controlling the personal mobility device.

Description of Related Art

A personal mobility (also referred to as a mobility device) is a means of transportation powered by electricity, and may be an electric wheel, a mobility scooter, an electric scooter, an electric bicycle, an ultra-small electric vehicle, or the like.

A method of steering the personal mobility device includes a mechanical steering method and an electronic steering method, and recently, the electronic steering method has been widely adopted.

The electronic steering method generally identifies a user's intention of operation through a multiple degrees of freedom force-torque (F/T) sensor or an electromyography (EMG) sensor. However, the multiple degrees of freedom F/T sensors may be costly to manufacture and deploy, and it may be difficult for the EMG sensor to acquire a reliable signal.

SUMMARY

The present disclosure is directed to controlling a steering apparatus using a low-cost load cell instead of the expensive multiple degree of freedom F/T sensor.

A personal mobility device may have a steering difficulty for movement in an opposite direction that is not one direction in which a handle is configured, which is especially true when drive methods of a wheel in one direction and the opposite direction are different.

The matters described above are intended for better understanding of the background of the disclosure, and may include matters that are not already known to those skilled in the art to which this technology pertains.

The present disclosure has been made in efforts to solve the above problems, and an object of the present disclosure is to provide a system and a method of controlling a personal mobility device, which enable a steering control of the personal mobility device using a low-cost load cell, and facilitate a bi-directional steering of the personal mobility device.

One aspect of the present disclosure provides a personal mobility device including a personal mobility device body including a first wheel mounted at a front portion and a second wheel mounted at a rear portion with respect to a longitudinal direction of the personal mobility body. The personal mobility device may include a first steering apparatus connector disposed at the front portion. The personal mobility device may include a second steering apparatus connector disposed at the rear portion. The personal mobility device may include a steering rod that includes an operable handle, and mountable on any one of the first steering apparatus connector or the second steering apparatus connector. The personal mobility device may include a load cell assembly provided on each of the first steering apparatus connector and the second steering apparatus connector, and the load cell assembly may include a plurality of load cells.

The steering rod may be inserted into and mounted on a rod mount having an opening at an upper end of the rod mount.

The personal mobility device may further include a connection rod connected to a lower portion of the steering rod and inserted into the rod mount. Displacement of the connection rod may occur by an operation of the steering rod. At least some of the plurality of plurality of load cells may be disposed at a top, a bottom, a left side, and a right side of the connection rod to detect the displacement of the connection rod.

The first wheel or the second wheel may be driven by an electric motor.

One of the first wheel or the second wheel may be driven by the electric motor, and another one of the first wheel or the second wheel may be a caster wheel.

The personal mobility device may further include a steering controller embedded in the personal mobility device body, and configured to calculate a steering direction and a steering velocity based on one or more voltage measurements of the plurality of load cells, and a drive controller configured to drive the electric motor based on a signal indicating the steering direction and the steering velocity transmitted from the steering controller.

The steering controller may include: a distributor configured to receive the one or more voltage measurements of the plurality of load cells, an analog-to-digital converter configured to convert an analog signal received by the distributor into a digital signal, and a controller configured to calculate the steering direction and the steering velocity based on the digital signal converted by the analog-to-digital converter.

The controller may be further configured to calculate the steering velocity by dividing a sum of the one or more voltage measurements by a quantity of plurality of load cells.

The load cell assembly may include a first load cell assembly provided in the first steering apparatus connector disposed at the front portion and a second load cell assembly provided in the second steering connector disposed at the rear portion.

A method may include sensing, by a personal mobility device including a first load cell assembly provided at a front portion of the personal mobility device and further including a second load cell assembly provided at a rear portion of the personal mobility device, a voltage of the first load cell assembly and a voltage of the second load cell assembly, determining whether the voltage of the first load cell assembly is greater than or equal to a minimum voltage threshold, determining whether the voltage of the second load cell assembly is greater than or equal to the minimum voltage threshold, and transmitting a stop signal to a drive controller of the personal mobility device based on the voltage of the first load cell assembly and the voltage of the second load cell assembly being less than the minimum voltage threshold.

The method further include sensing one or more voltage values of a plurality of load cells included in the first load cell assembly based on the voltage of the first load cell assembly being greater than or equal to the minimum voltage threshold, calculating a steering direction based on the one or more voltage values of the plurality of load cells included in the first load cell assembly, calculating a steering velocity based on the one or more voltage values of the plurality of load cells included in the first load cell assembly, and transmitting the steering direction and the steering velocity the drive controller.

The method may include sensing one or more voltage values of a plurality of load cells included in the second load cell assembly based on the voltage of the second load cell assembly being greater than or equal to the minimum voltage threshold, calculating a steering direction based on the one or more voltage values of the plurality of load cells included in the second load cell assembly, calculating a steering velocity based on the one or more voltage values of the plurality of load cells included in the second load cell assembly, and transmitting the steering direction and the steering velocity to the drive controller.

The personal mobility device may further include a first wheel mounted at the front portion and a second wheel mounted at the rear portion. One of the first wheel or the second wheel may be driven by an electric motor, and another one of the first wheel or the second wheel may be a caster wheel.

Calculating of the steering velocity may include dividing a sum of the one or more voltage values of the plurality of load cells included in the second load cell assembly by a quantity of the plurality of load cells included in the second load cell assembly.

The present disclosure may provide the following advantages and effects.
1) The electronic steering apparatus can have advantages in terms of size and weight compared to the mechanic steering apparatus, and the electronic steering apparatus can enhance reliability of the system by simplifying the fail-safe function.
2) The electronic steering method to which the load cell is applied can implement the electronic steering at low costs because the cost is cheap compared to other steering methods, and greatly improve accuracy for the steering using the plurality of load cells.
3) The steering method according to the present disclosure can be applied to the personal mobility device, and various utilities can be applied to the upper end of the 4-wheel-based personal mobility device based on the board platform thereunder, and the personal mobility device can be steered in both directions in the method of separating or inserting the steering stick from or into the front or rear of the personal mobility device by mounting the load cell assembly at both sides of the front end and the rear end of the personal mobility device so that the steering is performed at the front and the rear when the types of wheels are different for each utility.
4) The personal mobility device to which the steering method according to the present disclosure can be applied includes an electric wagon, an electric stroller, an electric scooter, an electric vehicle, an electric cart, and the like.
5) The load cell-based electronic steering apparatus can subdivide and distinguish the type of failure, thereby quickly taking an action against failure, and when defects occur in the load cell, it is possible to prevent the accidents of the steering defects by interrupting the subsequent sequences or operations, and save the maintenance cost of the product by preventing the problem due to the failure of the system from having a bigger impact on the entire product.

DESCRIPTION OF SPECIFIC EMBODIMENTS

To fully understand the present disclosure, the operational advantages of the present disclosure, and the objects achieved by practicing the present disclosure, reference should be made to the accompanying drawings showing preferred embodiments of the present disclosure and the contents described in the accompanying drawings.

In describing preferred embodiments of the present disclosure, the description of well-known techniques or repetitive descriptions that may unnecessarily obscure the gist of the present disclosure will be reduced or omitted.

Figure 1:
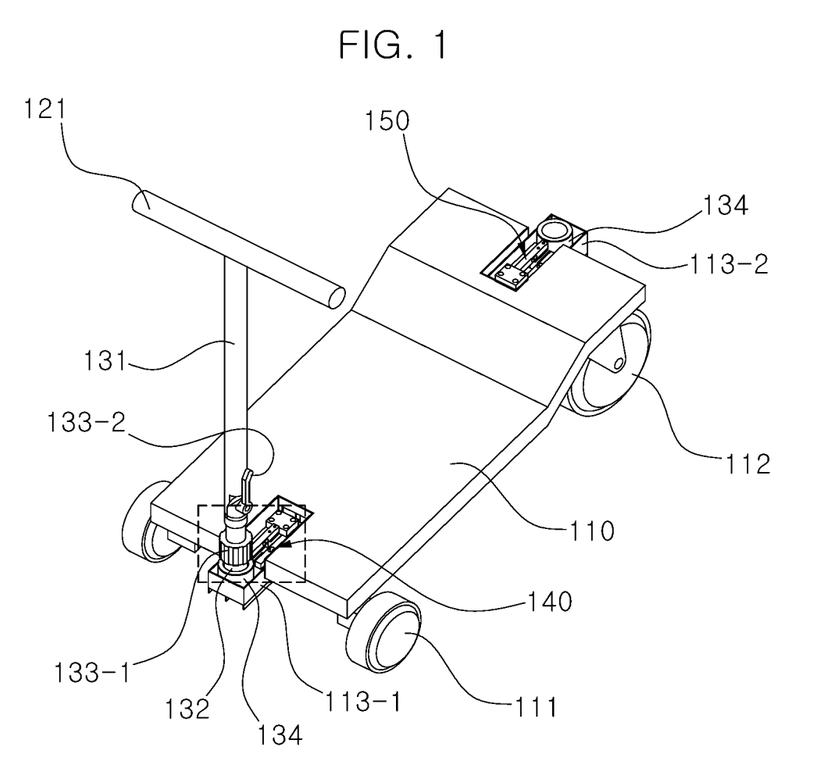
FIGS. 1 and 2 are schematic views of an example personal mobility device to with a load cell steering system.
Figure 2:
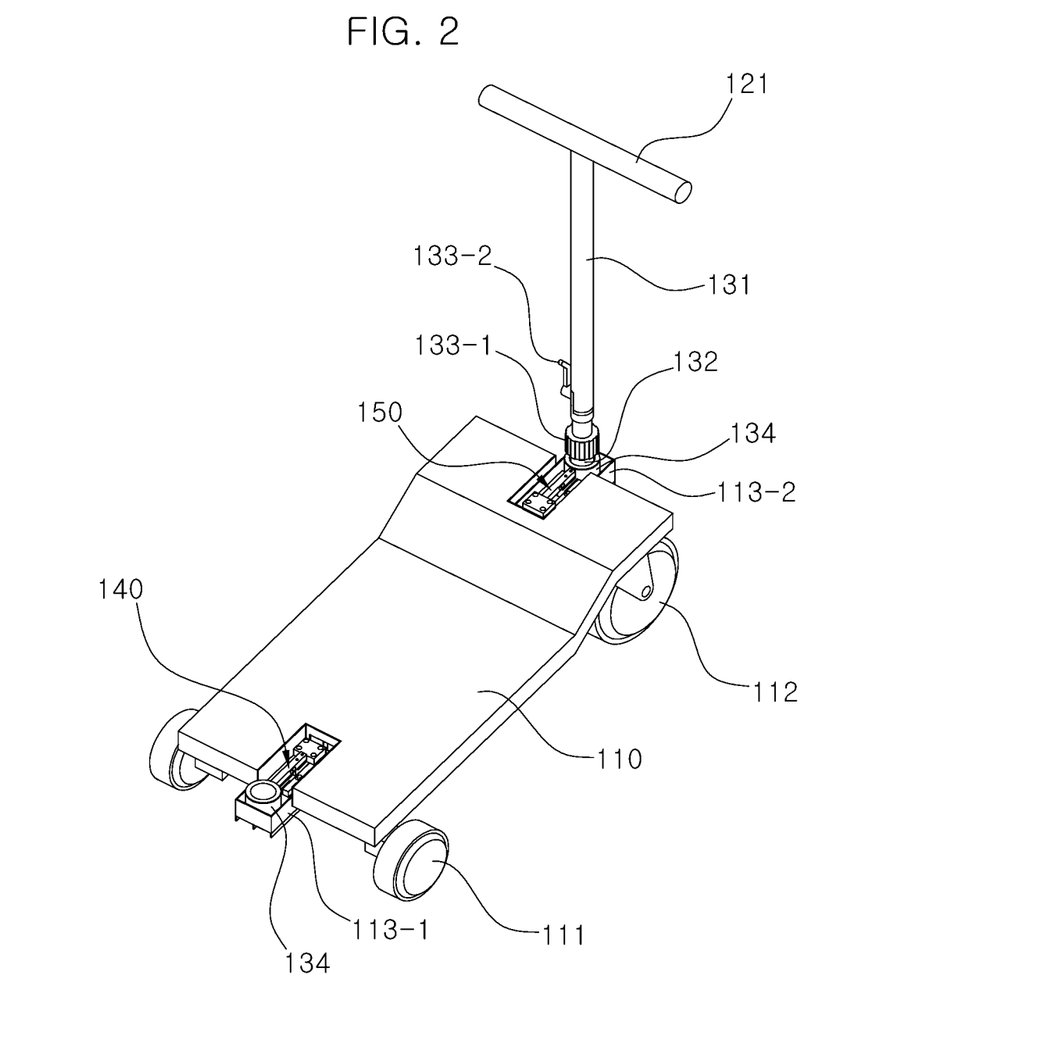
Figure 3:
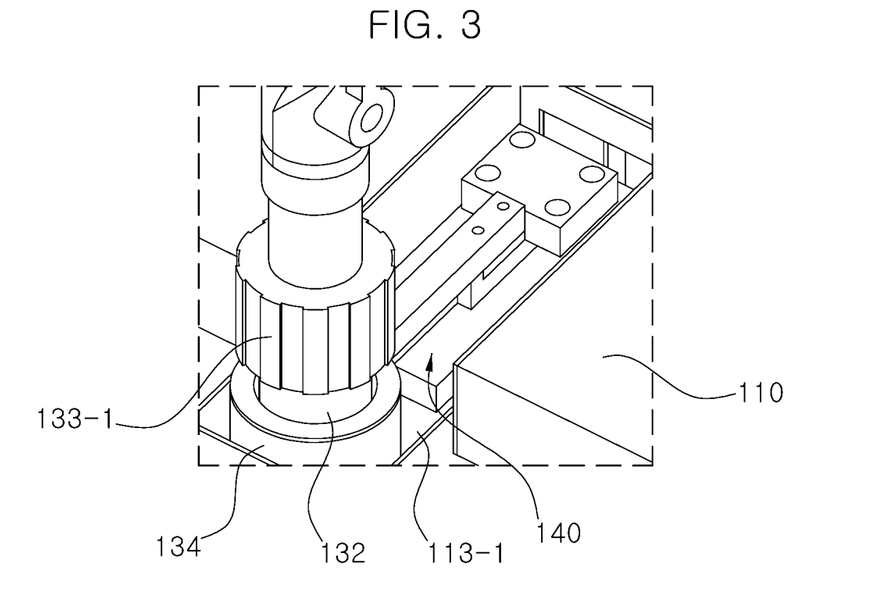
FIG. 3 is an enlarged view of a dotted portion in FIG. 1.
Figure 4:
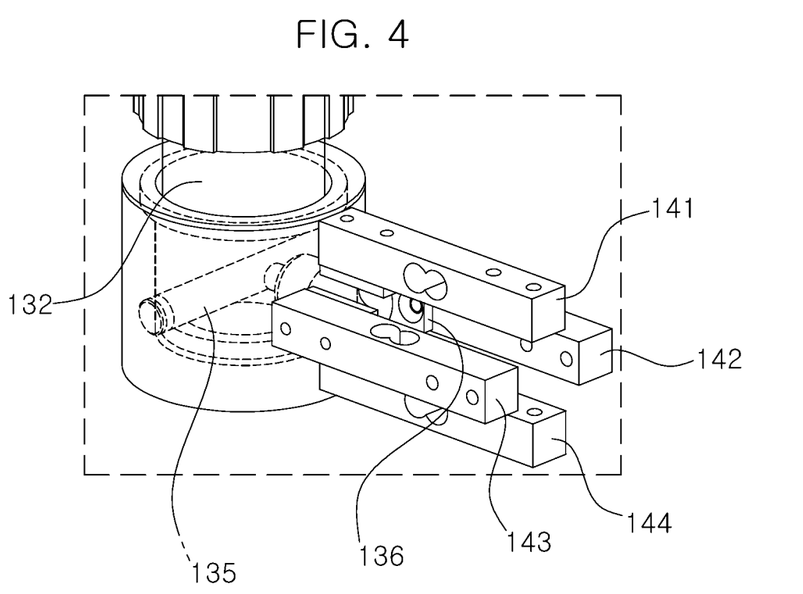
FIG. 4 is a detailed view of an example steering apparatus and an example load cell assembly.

FIGS. 1 and 2 are schematic views of an example personal mobility device with a load cell steering system, FIG. 3 is an enlarged view of a dotted portion in FIG. 1, and FIG. 4 is a detailed view of an example steering apparatus and an example load cell assembly.

Hereinafter, a personal mobility device according to one embodiment of the present disclosure will be described with reference to FIGS. 1 to 4.

The present disclosure provides a system capable of applying a load cell for steering of a personal mobility device, and steering the personal mobility device in both longitudinal directions of the personal mobility device.

The present disclosure provides the system in which wheels are provided at each of the front and the rear of the personal mobility device in order to use the load cell in a method of steering the personal mobility device, and in particular, the steering may be performed more usefully when the bi-directional wheel methods of wheels are different.

In other words, the left-right directions (e.g., rotation) and forward/backward situations (e.g., movement) are determined by detecting a driver's steering movement by the steering apparatus through the load cell, and recognizing a digital signal output through a sensor signal processing system of the load cell by a steering control system.

Furthermore, left-right rotations and forward/backward movements may be determined by installing a plurality of load cells next to a steering mechanism to sense the direction of the force applied to the steering mechanism. In addition, the present disclosure provides a technology of sensing a traveling intensity of the driver by averaging values of the forces received from the plurality of load cells.

In addition, when the bi-directional wheels are different, it may be convenient for a steering handle to be steered at the front or rear of the personal mobility device. For example, when the front wheels use a caster wheel and the rear wheels use electric wheels using a motor (e.g., wheels driven by an electric motor), it may be advantageous for steering when the front wheels are provided at the front for the steering mechanism electrically driven, and it may be convenient for steering when the caster wheels are provided at the front for the steering mechanism manually driven. Alternatively, when a mobility device platform has a structure that may be changed so that an upper structure may be used for various utilities, there may be a case in which the steering method may be applied to the front or rear of the personal mobility device.

Referring to FIGS. 1 and 2, a mobility device body 110 may include a flat portion to seat people or objects on the flat portion and transport them. The mobility device body 110 may have a first set of wheels 111 provided on a lower portion at one end (e.g., front portion) in a longitudinal direction and a second set of wheels 112 provided on a lower portion at an opposite end (e.g., rear portion), and the first set of wheels 111 and the second set of wheels 112 may be provided as wheels having different steering methods.

In other words, the first set of wheels 111 may be configured as caster wheels, and the second set of wheels 112 may be configured as electric wheels driven by a motor.

In addition, steering apparatus connectors (also referred to as accommodating units) 113-1 and 113-2 in which the steering apparatus to be described below may be seated and mounted may be formed in both longitudinal directions of the mobility device body 110, and may protrude with respect to the mobility device body 110.

The steering apparatus may include a steering rod composed of a handle (e.g., handlebar) 121, a steering stick 131, a coupling stick 132, a rod mount (also referred to as a rod seating unit) 134, a coupling rod 135, and a connection rod 136. The steering rod may be steered based on a sensor value of the load cell assembly connected to the connection rod 136 by operating the above components.

The load cell assembly may be provided in the steering device connectors 113-1 and 113-2 formed at both ends of the mobility device body 110.

A load cell may be a sensor capable of measuring physical quantities such as force and weight by generating an electrical signal according to the magnitude of an applied force.

For example, the load cell may be used to measure forces and moments in an experiment with fuselages of rotating units such as electronic scales, robot gripper sensors, machine tool industry, automobile industry, aircraft, and wind tunnels.

The rod mount 134 may be provided in a cylindrical shape having an opening at an upper end on the steering device connectors 113-1 and 113-2, and the coupling stick 132 may be inserted into the rod mount 134.

The handle 121 and the steering stick 131 extending from a middle end of the handle 121 may be provided, and the steering stick 131 and the coupling stick 132 may be fastened by a fastener (also referred to as a fastening member) 133-2.

The fastener 133-2 fastens both the steering stick 131 and the coupling stick 132 to be formed in a side-by-side direction. The fastener 133-2 may fasten the steering stick 131 and the coupling stick 132 so that the steering stick 131 is foldable by rotating the steering stick 131 with respect to the coupling stick 132 by a rotating operation or the like.

The coupling stick 132 may be inserted into the rod mount 134, and both ends of the coupling rod 135 passing through the coupling stick 132 may be coupled to the inside of the rod mount 134, and thus the rod mount 134 may be operated together when the coupling stick 132 is operated.

In addition, an adjuster 133-1 may be provided to surround an outside of the coupling stick 132, and provided to adjust a height of the coupling stick 132 by performing the relative motion between the adjuster 133-1 and the coupling stick 132 by a means such as a screw thread or the like.

According to the present disclosure, the bi-directional wheels of the mobility device body 110 may be different (e.g., the front wheels may be different from the rear wheels), and to this end, the mobility device body 110 may be configured so that the handle 121, the steering stick 131, and the coupling stick 132 may be seated in the rod mount 134 in the first steering apparatus connector 113-1 associated with the first set of wheels 111 as shown in FIG. 1, or the handle 121, the steering stick 131, and the coupling stick 132 may be seated in the rod mount 134 in the second steering apparatus connector 113-2 associated with the second set of wheels 112 as shown in FIG. 2.

The present disclosure is configured so that a first load cell assembly 140 may be accommodated in the first steering apparatus connector 113-1 of the first set of wheels 111, and a second load cell assembly 150 may be accommodated in the second steering apparatus connector 113-2 of the second set of wheels 112, that is, the load cell assembly may be provided in either direction, and the wheels may be steered by the load cell assembly, of the corresponding wheels, sensed through the steering rod.

To this end, the displacement of the coupling rod 135 by an operation of the steering rod may be transmitted to the connection rod 136, and the displacement of the connection rod 136 may be detected by the load cell assembly surrounding the connection rod 136, so that it is possible to determine the degree of steering.

As shown in FIG. 4, the first load cell assembly 140 may include a first load cell 141 disposed at the top of the connection rod 136, a second load cell 142 disposed on the right side thereof, a third load cell 143 disposed on the left side thereof, and a fourth load cell 144 disposed at the bottom thereof. The second load cell assembly 150 may include a fifth load cell 151 disposed at the top of the connection rod, a sixth load cell 152 disposed on the right side thereof, a seventh load cell 153 disposed on the left side thereof, and an eighth load cell 154 disposed at the bottom thereof.

According to the present disclosure, the left-right directions (e.g., rotation) and forward/backward situations (e.g., movement) are determined by using this by detecting a driver's steering movement through the bi-directional load cell, and recognizing a digital signal output through a sensor signal processing system of the load cell by a steering control system, and left-right rotations and forward/backward movements are determined by installing a plurality of load cells next to the steering mechanism to sense the direction of the force applied to the steering mechanism. In addition, the load cell assembly may sense the traveling intensity of the driver by averaging values of the forces received from the plurality of load cells.

The load cell assembly may be an apparatus having the plurality of load cells for more accuracy, and for inducing the steering by sensing the direction of the force applied to the steering apparatus.

When the first load cell assembly 140 is disposed as shown in FIG. 4, the first load cell 141 may mainly sense the backward movement direction, and the second load cell 142 and the third load cell 143 may receive a weak force. The second load cell 142 may mainly be responsible for right rotation (e.g., a clockwise rotation that indicates steering to the right), and the first load cell 141 and the fourth load cell 144 may receive a weak force. In addition, the third load cell 143 may mainly sense the left rotation (e.g., a counterclockwise rotation that indicates steering to the left), and the first load cell 141 and the fourth load cell 144 may receive a weak force.

In addition, the fourth load cell 144 may mainly receive a force for forward movement, and the second load cell 142 and the third load cell 143 may receive a weak force.

In addition, according to the present disclosure, when the steering rod including the handle 121, the steering stick 131, and the coupling stick 132 is mounted in the direction (e.g., toward the first set of wheels 111) shown in FIG. 1, the second load cell assembly 150 may not sense the intensity of the force, and only the first load cell assembly 140 may be used to sense the intensity of the force. Likewise, when the steering rod is mounted in the direction (e.g., toward the second set of wheels 112) shown in FIG. 2, only the second load cell assembly 150 may sense the intensity of the force, and the first load cell assembly 140 may not sense the intensity of the force. To this end, the controller 163 of the steering control system may sense on which end the steering rod is mounted (e.g., front-mounted as shown in FIG. 1 or back-mounted as shown in FIG. 2).

Figure 5:
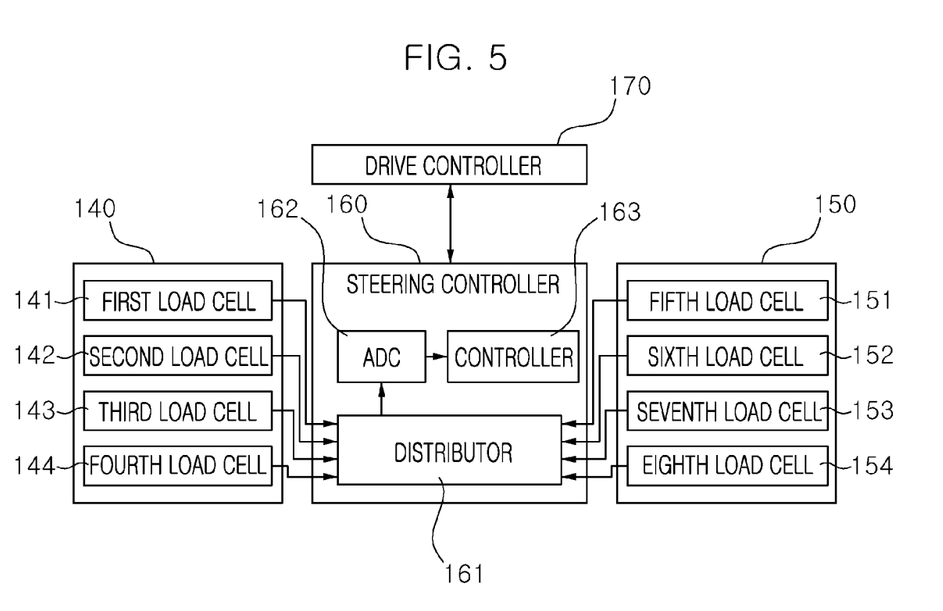
FIG. 5 is a block diagram of an example load cell assembly and an example steering control system.

Next, FIG. 5 is a block diagram showing the relationship between the load cell assembly and the steering control system.

The steering control system may include a controller (also referred to as a steering control unit) 160 and a drive controller (also referred to as a drive control unit) 170, and is embedded in the mobility device body 110.

The steering controller 160 may include a distributor (also referred to as a distribution unit) 161 (e.g., a signal distributor, a multiplexer), an analog-to-digital converter (ADC) 162, and a controller (also referred to as a control unit) 163. The distributor 161 may be connected to each load cell of the first load cell assembly 140 and the second load cell assembly 150.

A sensor value sensed by each of the load cells 141, 142, 143, 144, 151, 152, 153, and 154 may be received by a distributor 161, and the signal received by the distributor 161 may be transmitted to the analog-to-digital converter 162 and converted into a digital signal.

The converted digital signal may be transmitted to the controller 163, and the controller 163 may determine, based on the signal from each load cell, at which end of the mobility device body 110 the steering rod is mounted.

In addition, the controller 163 may determine the left and right rotations, and forward and backward movements (e.g., intended directions of movement) of the personal mobility device from the intensity of the force applied to each load cell through the received digital signal, and calculate the movement velocity (e.g., steering velocity) through an average value of the magnitudes of the forces of the respective load cells and transmits the movement velocity (e.g., steering velocity) to the drive controller 170.

The average value of the magnitudes of the forces of the load cells may be calculated by the following equation, where n refers to the number of load cells, and $v_i$ refers to a voltage value received from each load cell.

$$v(x) = \frac{\sum_{i=1}^{n}(v_i)}{n}$$

Next, an example method of steering the personal mobility device and the load cell steering system for the personal mobility device according to the present disclosure as described above will be described with reference to FIG. 6.

Figure 6:
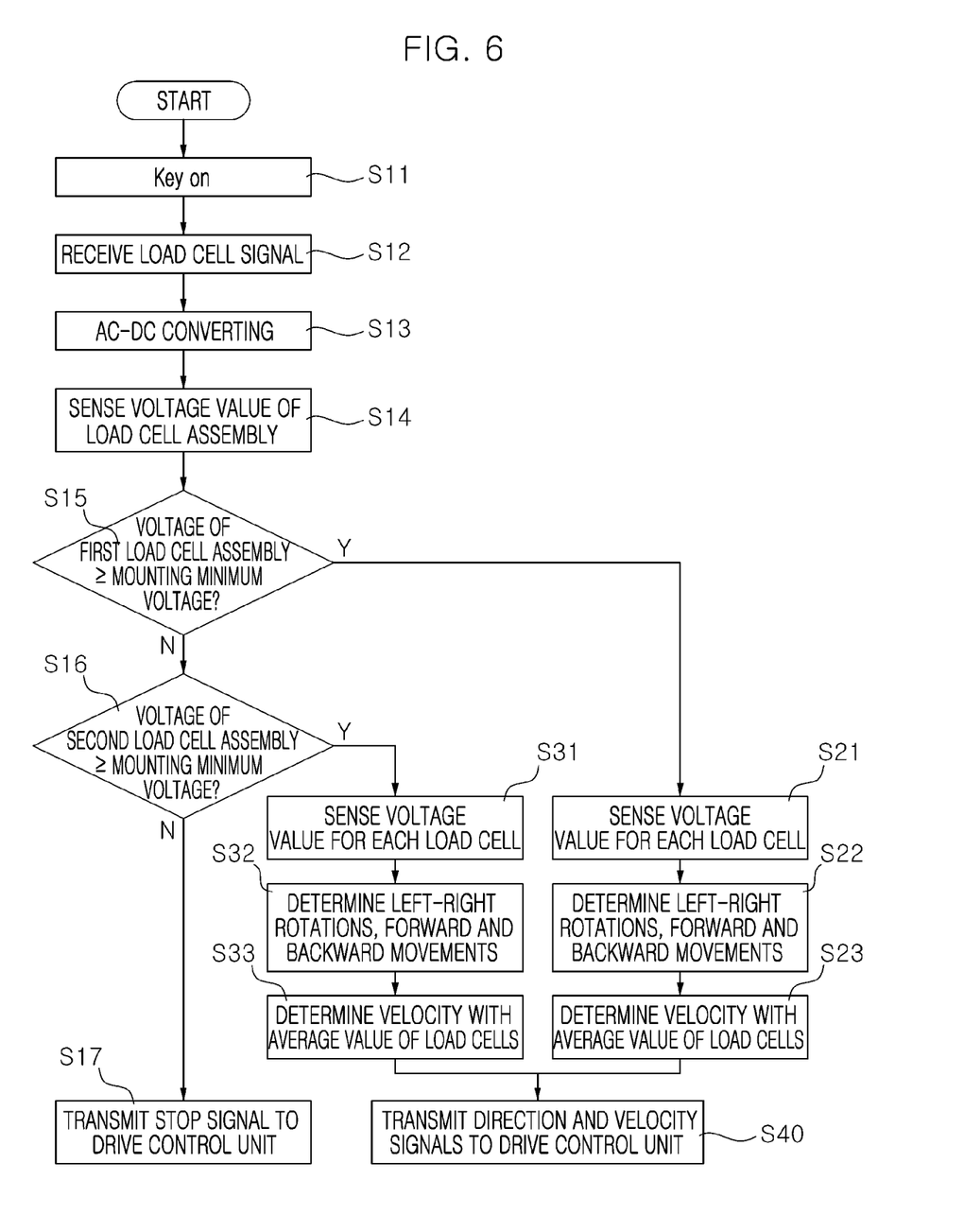
FIG. 6 shows an example method of controlling the steering of a personal mobility device.

In a key-on state (S11) (e.g., an ignition key is inserted to an ignition lock cylinder), each load cell signal may be received through the distributor 161 of the steering control system (S12). The alternating current to direct current (AC-DC) converting may be performed by the analog-to-digital converter 162 (S13). The voltage values of the load cell assemblies 140 and 150 may be sensed by the controller 163 (S14).

The controller 163 may determine whether the voltage of the first load cell assembly 140 is greater than or equal to a preset (e.g., threshold) mounting minimum voltage (S15), and determine that the steering rod has been mounted on the first load cell assembly 140 side when the voltage of the first load cell assembly 140 is greater than or equal to the mounting minimum voltage.

When the voltage of the first load cell assembly 140 is less than the mounting minimum voltage, the controller 163 may determine whether the voltage of the second load cell assembly 150 is greater than or equal to the mounting minimum voltage, and determine that the steering rod has been mounted on the second load cell assembly 150 side when the voltage of the second load cell assembly 150 is greater than or equal to the mounting minimum voltage.

In addition, when it is determined that the voltage of the second load cell assembly 150 is less than the mounting minimum voltage, a stop signal may be transmitted to the drive controller (S17).

When the steering rod is determined to be mounted on the first load cell assembly 140 side (S15: Yes), the voltage value for each load cell corresponding to the first load cell assembly 140 side may be sensed (S21), whether there are left-right rotations or forward and backward movements may be determined based on the sensor value(s) (S22), and the movement velocity (e.g., steering velocity) may be determined based on the average value of the magnitudes of the forces of the load cells (S23).

When the steering rod is determined to be mounted on the second load cell assembly 150 side (S16: Yes), the voltage value for each load cell corresponding to the second load cell assembly 150 side may be sensed (S31), whether there are left-right rotations or forward and backward movements may be determined based on the sensor value(s) (S32), and the movement velocity may be determined based on the average value of the magnitudes of the forces of the load cells (S33).

The determined direction and velocity signals may be transmitted to the drive controller (S40) so that the electric wheels 112 may be driven.

The present disclosure has been described above with reference to the exemplary drawings, but is not limited to the described embodiments, and it is apparent by those skilled in the art that the present disclosure may be variously modified and changed without departing from the spirit and scope of the present disclosure. Accordingly, these modifications or changes should belong to the claims of the present disclosure, and the scope of the present disclosure should be interpreted based on the appended claims.

What is claimed is:
1. A personal mobility device comprising:
 a personal mobility device body comprising:
  a first wheel mounted at a front portion with respect to a longitudinal direction of the personal mobility device body, and a second wheel mounted at a rear portion with respect to the longitudinal direction of the personal mobility device body;

a first steering apparatus connector disposed at the front portion;

a second steering apparatus connector disposed at the rear portion;

a steering rod comprising an operable handle, wherein the steering rod is mountable on any one of the first steering apparatus connector or the second steering apparatus connector;

a load cell assembly provided on each of the first steering apparatus connector and the second steering apparatus connector, wherein the load cell assembly comprises a plurality of load cells; and a connection rod connected to a lower portion of the steering rod, wherein displacement of the connection rod occurs by an operation of the steering rod, wherein at least some of the plurality of load cells are disposed at a top, a bottom, a left side, and a right side of the connection rod to detect the displacement of the connection rod.

2. The personal mobility device of claim 1, wherein the steering rod is inserted into and mounted on a rod mount having an opening at an upper end of the rod mount.

3. The personal mobility device of claim 1, wherein the first wheel or the second wheel is driven by an electric motor.

4. The personal mobility device of claim 3, wherein one of the first wheel or the second wheel is driven by the electric motor, and another one of the first wheel or the second wheel is a caster wheel.

5. The personal mobility device of claim 3, further comprising:

a steering controller embedded in the personal mobility device body, and configured to calculate a steering direction and a steering velocity based on one or more voltage measurements of the plurality of load cells; and a drive controller configured to drive the electric motor based on a signal indicating the steering direction and the steering velocity, wherein the signal is transmitted from the steering controller.

6. The personal mobility device of claim 5, wherein the steering controller comprises:

a distributor configured to receive the one or more voltage measurements of the plurality of load cells;

an analog-to-digital converter configured to convert an analog signal received by the distributor into a digital signal; and a controller configured to calculate the steering direction and the steering velocity based on the digital signal converted by the analog-to-digital converter.

7. The personal mobility device of claim 6, wherein the controller is further configured to calculate the steering velocity by dividing a sum of the one or more voltage measurements by a quantity of the plurality of load cells.

8. The personal mobility device of claim 5, wherein the load cell assembly includes:

a first load cell assembly provided in the first steering apparatus connector disposed at the front portion; and a second load cell assembly provided in the second steering apparatus connector disposed at the rear portion.

9. A method comprising:

sensing, by a personal mobility device comprising a first load cell assembly provided at a front portion of the personal mobility device and further comprising a second load cell assembly provided at a rear portion of the personal mobility device, a voltage of the first load cell assembly and a voltage of the second load cell assembly;

determining whether the voltage of the first load cell assembly is greater than or equal to a minimum voltage threshold;

determining whether the voltage of the second load cell assembly is greater than or equal to the minimum voltage threshold; and transmitting a stop signal to a drive controller of the personal mobility device based on the voltage of the first load cell assembly and the voltage of the second load cell assembly being less than the minimum voltage threshold, wherein the minimum voltage threshold corresponds to a voltage value indicating whether a steering rod is not mounted at the front portion or the rear portion of the personal mobility device.

10. The method of claim 9, further comprising:

sensing one or more voltage values of a plurality of load cells included in the first load cell assembly based on the voltage of the first load cell assembly being greater than or equal to the minimum voltage threshold;

calculating a steering direction based on the one or more voltage values of the plurality of load cells included in the first load cell assembly;

calculating a steering velocity based on the one or more voltage values of the plurality of load cells included in the first load cell assembly; and transmitting the steering direction and the steering velocity to the drive controller.

11. The method of claim 10, wherein the personal mobility device further comprises a first wheel mounted at the front portion and a second wheel mounted at the rear portion, and wherein one of the first wheel or the second wheel is driven by an electric motor, and another one of the first wheel or the second wheel is a caster wheel.

12. The method of claim 10, wherein the calculating of the steering velocity comprises dividing a sum of the one or more voltage values of the plurality of load cells included in the first load cell assembly by a quantity of the plurality of load cells included in the first load cell assembly.

13. The method of claim 9, further comprising:

sensing one or more voltage values of a plurality of load cells included in the second load cell assembly based on the voltage of the second load cell assembly being greater than or equal to the minimum voltage threshold;

calculating a steering direction based on the one or more voltage values of the plurality of load cells included in the second load cell assembly;

calculating a steering velocity based on the one or more voltage values of the plurality of load cells included in the second load cell assembly; and transmitting the steering direction and the steering velocity to the drive controller.

14. The method of claim 13,
wherein the personal mobility device further comprises a first wheel mounted at the front portion and a second wheel mounted at the rear portion, and
wherein one of the first wheel or the second wheel is driven by an electric motor, and another one of the first wheel or the second wheel is a caster wheel.

15. The method of claim 13,
wherein the calculating of the steering velocity comprises dividing a sum of the one or more voltage values of the plurality of load cells included in the second load cell assembly by a quantity of the plurality of load cells included in the second load cell assembly.

16. A personal mobility device comprising:
a personal mobility device body comprising:
   a first wheel mounted at a front portion with respect to a longitudinal direction of the personal mobility device body, and
   a second wheel mounted at a rear portion with respect to the longitudinal direction of the personal mobility device body;
a first steering apparatus connector disposed at the front portion;
a second steering apparatus connector disposed at the rear portion;
a steering rod comprising an operable handle, wherein the steering rod is mountable on any one of the first steering apparatus connector or the second steering apparatus connector;
a first load cell assembly provided on the first steering apparatus connector;
a second load cell assembly provided on the second steering apparatus connector; and
a control circuit configured to:
   sense a voltage of the first load cell assembly;
   sense a voltage of the second load cell assembly; and
   based on the voltage of the first load cell assembly and the voltage of the second load cell assembly being less than a minimum voltage threshold, transmit a stop signal to a drive controller of the personal mobility device,
   wherein the minimum voltage threshold corresponds to a voltage value indicating whether the steering rod is not mounted at the front portion or the rear portion of the personal mobility device.

17. The personal mobility device of claim 16, wherein the first wheel or the second wheel is driven by an electric motor.

18. The personal mobility device of claim 16,
wherein one of the first wheel or the second wheel is driven by an electric motor, and another one of the first wheel or the second wheel is a caster wheel.

* * * * *